Oct. 21, 1941. E. E. HOLWICK 2,260,074
EGG CASE FILLER DIVISION PLATE
Filed June 9, 1938
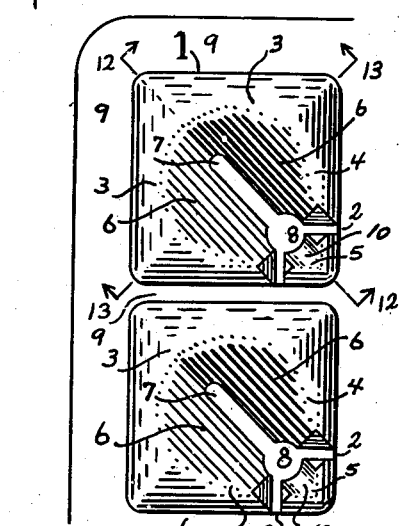
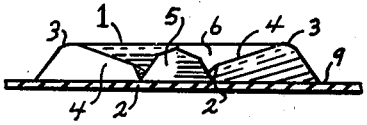
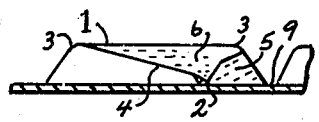
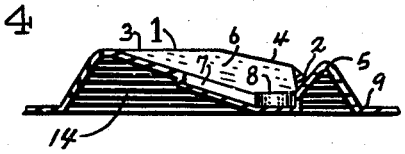
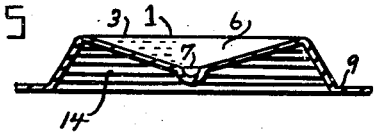
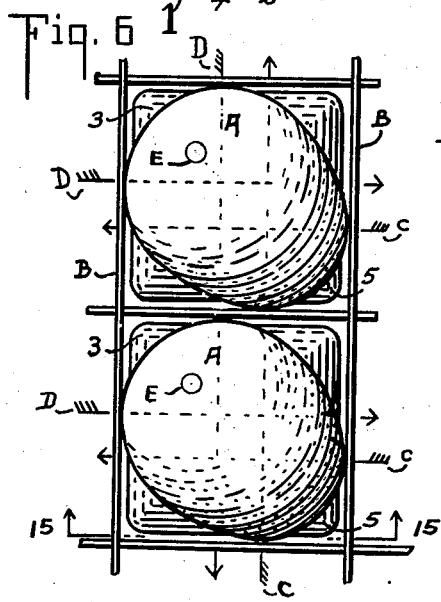
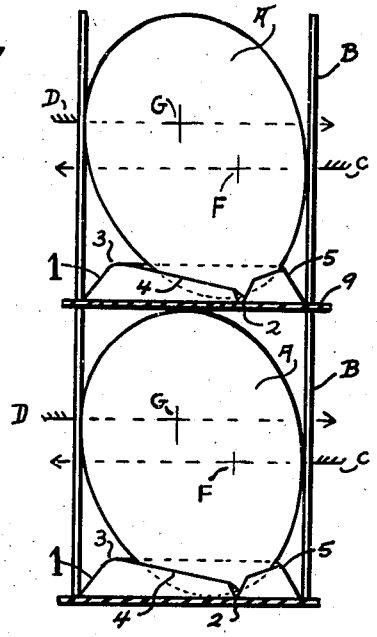
INVENTOR.
Earl E. Holwick Patented Oct. 21, 1941

2,260,074

UNITED STATES PATENT OFFICE 2,260,074

EGG CASE FILLER DIVISION PLATE

Earl E. Holwick, La Crescenta, Calif.

Application June 9, 1938, Serial No. 212,771

4 Claims. (Cl. 217—26.5)

My invention relates specifically to division plate devices adapted for use in conjunction with the cell forming fillers or partitions employed in egg cases, having means integral therewith for overcoming obvious difficulties encountered by packers and candlers of eggs prior to my invention, and particularly to eliminate the possibility of loss due to breakage of eggs in transit.

A principal object of the present invention is the production of a division plate provided with a plurality of equidistant spaced holders provided with recesses whereby the seepage of cracked eggs may flow to a point remote from the recesses in the adjacent holders.

Another principal object is the provision of means on said holders for retaining eggs in their inclined position after the partition fillers are removed and thereby preventing the possibility of breakage.

Another important object is to provide a filler division plate having means whereby each egg will engage all the walls of the cell and thereby prevent movement of the eggs.

A further object is to produce a filler division plate provided with a cushion formed in such a manner so as to lower the height of the eggs in their cells.

Another object is to afford facilities for the proper cushioning of the division plate to avoid direct contact between the ends of the eggs in the different layers.

These and other objects will become apparent from a consideration of the following description and by reference to the accompanying drawing forming a part thereof, in which—

Fig. 1 is a fragmentary top plan view of my invention.

Fig. 2 is a corner view of a cushioned egg positioner and holder.

Fig. 3 is a side elevation of the cushioned positioner shown in Fig. 2.

Fig. 4 is a sectional view taken on line 12—12 of Fig. 1 showing position of the inclined channel and duct.

Fig. 5 is a sectional view taken on line 13—13 of Fig. 1.

Fig. 6 is a similar view as that in Fig. 1, showing my invention in combination with partition fillers in position and containing eggs in the cells thereof, and Fig. 7 is a sectional view taken on line 15—15 of Fig. 6, showing the inclined position of the eggs in the cells.

The division plate comprises a molded sheet-like member formed from wood pulp or paper pulp, and having a plurality of upstanding square shaped holders or supports 1 equidistantly arranged in rows. Each holder consisting of a large projection 3 and a small projection 5, that extend upwardly from and are entirely surrounded at the base by the flat surface of the plate 9, and thus forming an angular recess between the projections. The outer ends 2—2 of this angular recess may be termed grooves, while the enlarged corner 8 may be called a duct. The projection 3 forms the sides and three corners of the holder. Two of the sides and the said three corners are of equal height or parallel with the base or flat surface, while the remaining sides 4—4 incline toward and end abruptly at the grooves 2—2. The inner walls 6 of the projection 3, as shown, slope inwardly and downwardly to the said recess to provide a slide or chute. In the valley between the inner walls or sides 4—4, a channel 7 provides a drain and air passage to the holder, and also adds flexibility to the support. The projection 5, which forms the fourth corner of the holder, extends upwardly to a height substantially equal to the height of the corners formed by projection 3, and provides a rest or stop for the slide or chute. It will be noted that the inner wall 10 of the projection 5 is slightly curved, to increase the contact surface and to provide flexibility to the rest against which an egg may lodge. It will be seen in the drawing, that the slide 6 on which an egg A may slide into an inclined position, when dropped into the cells formed by the partition fillers indicated at B, and thereby lodge against the curved rest 10 on the inner portion of the upward extended projection or stop 5.

It will be seen that the groove or channel 7 slopes downward from the ridge to the duct 8, the duct being preferably circular in shape and slightly lower than the edge of the chute 6. The bottom of the duct may be flat and on a plane with the flat surface of the division plate. The channels 2 may also be a continuation of the flat surface, and extend from the duct to the outer edge of the holders and thereby separate the projection 5 from the main portion of the ridge and slide. The channel 7, the channels and the duct 8 provide a means whereby air may circulate around the lower end of the eggs and also serve as a drain in case of breakage and thereby prevent the shell of cracked eggs from adhering to the holder and seal the pores of the lower ends of the eggs. It will be seen that by forming the drain in the manner described and illustrated in the drawing, that the drain in one holder is remote from the drains in the other holders, which enable free passage of the albumen or whites of the eggs to the grooves between the holders. It will be seen that the channels 2 and the ducts 8 completely divide the holders into large and small projections and by providing the channel 7 in the larger projections, positioners are formed of the said larger projections, so that when an egg is dropped into the holder it slides on the inclined walls 6 of the holder and rests against the sloping wall 10 of the smaller projection, and thereby forming a three point contact with the holder. The position in which these grooves 2—2 occupy in the holder, enable the seepage of any cracked egg to flow around the highest parts of the adjacent holders, and therefore cannot soil the eggs in said holders.

The height of the three corners of projection 3 are important, as they provide a brace for the inclined egg after the cell partition fillers are removed, while the projection 5 prevents the egg from sliding and thus prevent the possibility of breakage when the partition fillers are removed.

The holders are preferably square in shape and of slightly less in size than the bottom of the cells formed by the partition fillers. The holders are spaced apart sufficiently to provide a straight flat groove between the squares to provide a rest for the partition fillers and prevent side movement thereof. The projections 5 are all positioned in the same direction, so that the eggs A may be held in the same diagonal position in the cells as shown in Fig. 6.

In Figures 6 and 7, the division plate is being shown in combination with the partition fillers B and the eggs A, to show the effect of the positioners on the eggs in forming cushions of the partition fillers. The arrows D indicate the approximate point at which the eggs engage the upper portion of the walls on two sides of the cells, while the arrows C indicate the points of contact between the eggs and the walls on the opposite sides of the cells. The points of the arrows indicate the approximate spots at which each succeeding egg engages the opposite side of the partitions. Thus it may be observed, that the points of contact between the eggs on each side of the partitions differ, are spaced apart and at different elevations, as better shown at F and G in Fig. 7.

By the holders holding the eggs in the manner described, each of the cell walls are being engaged by the eggs, which prevents side movement of the eggs in the cells and thus avoids breakage due to the possible sudden impact between any two eggs at the same spot on the partitions when handling the cases.

By the ridge of the positioners, extending upward at three corners of the cells, recesses are provided on the reverse side of the division plates. These recesses 14, enable the positioners to fit over the upper ends of long eggs and permit the division plate to rest on the partition fillers without reducing the space in the cells and avoiding direct contact between the points of the eggs in the different layers of cells.

It will be obvious that the relative dimensions of the various parts, the number of grooves or notches, or the relative location and depth of the cushion, may all be varied without departing from the spirit of my invention. This division plate may also be formed by steam pressing or molded pulp.

What I claim and desire to secure by Letters Patent is:

1. In a packing for eggs comprising a sheet having a plurality of equidistantly spaced holders thereon, each of the said holders having in the bottom thereof a Y-shaped drain channel comprising one long and two short branches and consisting of a larger projection and a smaller projection entirely separated from each other at the base by the short branches of said Y-shaped channel, said larger projection having its inner walls sloping inwardly and downwardly to the long branch of the channel, said short drain channels terminating at the edges of the holder, said smaller projection forming with said larger projection an oval shaped recess, and being adapted to prevent movement of an egg in said holder when the cell partition fillers are removed.

2. In a packing for eggs, comprising a sheet having a plurality of spaced holders thereon, each of said holders having a larger projection and a smaller projection entirely separated at the base by said sheet and forming projecting corners on said holder, said larger projection forming with said smaller projection a recess bounded by three inner walls inclining inwardly and downwardly to said sheet in one corner of said holder.

3. In a packing for eggs, comprising a sheet having a plurality of spaced holders formed thereon, each of said holders having in the bottom thereof a Y-shaped channel comprising one long and two short branches and consisting of a larger projection and a smaller projection separated from each other by the short branches of said channel, said larger projection forming with said smaller projection a relatively large tapered recess extending downwardly to the short branches of the channel, and said channel adapted to ventilate said recess.

4. In a packing for eggs, comprising a sheet having a plurality of holders thereon, each of said holders having in the bottom thereof a Y-shaped channel comprising one long and two short branches and consisting of a larger projection and a smaller projection separated at the base by the short branches of the channel, a relatively large recess disposed between said projections, said larger projection having inner walls inclining inwardly and downwardly to the long branch of said channel and provide an inclined V-shaped valley extending diagonally to the short branches of said channel and to the base in one corner of said holder.

EARL E. HOLWICK.